US006470311B1

(12) United States Patent
Moncur

(10) Patent No.: US 6,470,311 B1
(45) Date of Patent: Oct. 22, 2002

(54) METHOD AND APPARATUS FOR DETERMINING PITCH SYNCHRONOUS FRAMES

(75) Inventor: Robert Brian Moncur, Orem, UT (US)

(73) Assignee: Fonix Corporation, Salt Lake City, UT (US)

( * ) Notice: Subject to any disclaimer, the term of this patent is extended or adjusted under 35 U.S.C. 154(b) by 0 days.

(21) Appl. No.: 09/418,587

(22) Filed: Oct. 15, 1999

(51) Int. Cl.[7] .............................................. G10L 11/06
(52) U.S. Cl. ...................... 704/208; 704/214; 704/219
(58) Field of Search ................................ 704/208, 214, 704/219, 223

(56) References Cited

U.S. PATENT DOCUMENTS

| 4,791,671 A | | 12/1988 | Willems ...................... 381/44 |
| 4,924,508 A | | 5/1990 | Crepy et al. ................... 381/38 |
| 5,226,108 A | | 7/1993 | Hardwick et al. .......... 704/200 |
| 5,774,837 A | * | 6/1998 | Yeldener et al. ............ 704/208 |
| 5,787,387 A | * | 7/1998 | Aguilar ...................... 704/208 |
| 5,933,808 A | | 8/1999 | Kang et al. |
| 6,078,880 A | * | 6/2000 | Zinser, Jr. et al. .......... 704/208 |
| 6,119,082 A | * | 9/2000 | Zinser, Jr. et al. .......... 704/223 |
| 6,138,092 A | * | 10/2000 | Zinser, Jr. et al. .......... 704/223 |
| 6,233,550 B1 | * | 5/2001 | Gersho et al. ............... 704/208 |

OTHER PUBLICATIONS

Wolfgang J. Hess, A Pitch–Synchronous Digital Feature Extraction System for Phonemic Recognition of Speech, IEEE Transactions on Acoustics, Speech and Signal Proceesing, vol. ASSP–24, No. 1, Feb. 1976, pp. 14–25.

Wolfgang Hess, et al., Accurate Time–Domain Pitch Determination of Speech Signals By Means of A Laryngograph, Speech Communications vol. 6, (1987), pp. 55–68.

Thomas Holton, et al., A Fundamental Approach to Automatic Speech Recognition Using Models of Auditory Signal Processing, Aug. 30, 1991, pp. 1–122, Defense Advanced Research Projects Agency, pp. 1–122.

M.V. Mathews, et al., Pitch Synchronous Analysis of Voiced Sounds, Journal of the Acoustical Society of America, vol. 33, No. 2, Feb. 1961, pp. 179–186.

Hiroshi Ohmura, Fine Pitch Contour Extraction By Voice Fundamental Wave Filtering Method, IEEE (1994), pp. 189–192.

Lawrence R. Rabiner, et al., A Comparative Performance Study of Several Pitch Detection Algorithms, IEEE Transactions on Acoustics, Speech and Signal Processing, vol. AASP–24, No. 5, Oct. 1976, pp. 399–418.

D.C. Wood, et al, Excitation Synchronous Formant Analysis, IEEE Proceedings, vol. 136, Pt. 1, No. 2, Apr. 1989, pp. 110–119.

* cited by examiner

Primary Examiner—Susan McFadden
(74) Attorney, Agent, or Firm—Finnegan, Henderson, Farabow, Garrett & Dunner, L.L.P.

(57) ABSTRACT

In a speech processing system, an optimal filter frequency is determined and used to filter an unfiltered signal. The optimum filter is chosen by passing the largest voice area greater than 50 ms through multiple filters. The average energy output for each filter and differences between the filter averages (DeltaEnergy) are calculated. The first peak in DeltaEnergy above the average DeltaEnergy determines the optimal filter for filtering the signal. The filtered signal is divided into segments and voiced periods are determined. The unfiltered signal is divided into pitch synchronous frames based on the filtered signal.

34 Claims, 7 Drawing Sheets

METHOD AND APPARATUS FOR DETERMINING PITCH SYNCHRONOUS FRAMES

BACKGROUND OF THE INVENTION

The present invention relates generally to speech processing systems, and in particular to apparatus and methods for determining pitch synchronous frames.

Pitch detection is an important component of a variety of speech processing systems such as automatic speech recognition (ASR) systems, speech reconstruction systems for the hearing-impaired, and speech analysis-synthesis systems like vocoders. Speech recognition and synthesis involves a complicated process of extracting and identifying the individual sounds that make human speech. Wide variations between speakers' dialect, intonation, rhythm, stress, volume, and pitch, coupled with extraneous background noises, make speech processing difficult.

Many conventional speech processing systems divide an audio speech signal into signal segments and extract speech characteristics, or features, from each segment. Vocoders, for example, analyze speech by first segmenting the speech and then determining excitation parameters, the voiced/unvoiced decision, and pitch period for each segment. In vocoders, for example, the features are used to reconstruct and synthesize speech. Because pitch is an important speech parameter, inaccurate estimation of the pitch will often result in poor quality synthesized speech. In an ASR system, features are used to estimate the probabilities of phonemes, speech units that form words and sentences. Accurate estimation of the pitch period decreases the amount of noise in the extracted features, and therefore increases the probability of selecting the right phoneme.

The accuracy of speech processing systems therefore depends in large part on the accuracy of the pitch measurement and the pitch period. Pitch period is defined as the elapsed time between two successive laryngeal pulses. There are several difficulties in accurately determining pitch and pitch period. First, a speech waveform is not perfectly periodic, varying both in period and in the detailed structure of the waveform within a period, making exact periods difficult to detect. Second, fundamental frequencies vary widely not just between speakers but for a single speaker due to vocal tract abnormalities that produce irregular glottal excitations, making pitch difficult to determine. Third, there is no uniformity in the way the beginning and endings of pitch periods are determined. The measurement of the period may begin and end at any arbitrary point within the glottal cycle, however, an easily recognizable extreme, such as a zero crossing or wave peak, is frequently chosen. Wave peaks, however, may be altered by Formant structure and zero crossings are sensitive to formants and noise. Fourth, the transitions between low-level voiced speech and unvoiced speech segments may be very subtle and difficult to detect.

Despite these difficulties, several pitch detection algorithms (PDAs) have been developed. A PDA is a method or device that identifies voiced and unvoiced areas of a speech signal and provides a measurement of the pitch period. Examples of conventional PDAs include the: 1) cepstrum method (CEP), modified autocorrelation using clipping (AUTOC); simplified inverse filtering technique (SIFT), data reduction method (DARD), parallel processing time-domain method (PPROC), spectral flattening, linear predictive coding (LPC), and average magnitude difference function (AMDF). Although many of the conventional PDAs work well under ideal conditions, none of them work perfectly for every voice and set of environmental conditions. PDAs are described and compared in Rabiner et al., "A Comparative Performance Study of Several Pitch Detection Algorithms," IEEE Transactions on Acoustics, Speech, and Signal Processing, Vol. ASSP-24, No.5, October 1976, pp. 399–418.

PDAs may be grouped into categories depending on whether they make determinations principally on the time-domain (long-term), frequency-domain (short-term), or a hybrid of properties of the speech signal. Time-domain PDAs may be further categorized into fundamental-harmonic extraction and temporal structure analysis PDAs. Fundamental-harmonic extraction PDAs preprocess the signal by, for example, low pass filtering, to attenuate high frequencies above approximately 300hz. After preprocessing, pitch periods are extracted either between zero crossings, at threshold crossings, or with reference to multiple thresholds.

In temporal structure analysis, the signal envelope is modeled and searched for discontinuities which mark the beginning of individual periods ("envelope analysis") or features are extracted from the signal to define anchor points from which periodicity is derived by an iterative process of selection and elimination ("signal analysis").

Short term analysis PDAs, such as the autocorrelation, cepstral, harmonic compression, and maximum likelihood algorithms, perform a sequence of events similar to that of time-domain pitch PDAs. An optional pre-processing step such as moderate low-pass filtering, approximation of the inverse filter, or an adaptive center clipping is performed. The signal is then divided into short segments which include several pitch periods. A short-term transform is performed on each segment. Using autocorrelation, the input signal is compared with itself with some delay lag factor. If the signal is periodic, there will be a high degree of correlation when the lag equals one period or a multiple of the lag. The cepstrum PDA transforms the spectrum back into the time domain, generating a large peak at its period duration $T_0$. Using harmonic compression, the log power spectrum is compressed along the frequency axis by integer factors. Adding the compressed spectra causes the harmonics to contribute coherently to the distinct peak at the fundamental frequency. The maximum likelihood procedure is used to find a periodic estimate depending on a trial period which is most likely to represent the original periodic component. In each of these cases, peaks generated by the transform are detected and labeled as a pitch estimate for each segment. These PDAs are unable to track instantaneous periods since the phase relationship with the original signal is lost through short-term transformation.

SUMMARY OF THE INVENTION

The present invention discloses methods and apparatus for dividing a speech signal into frames in synchrony with pitch of the speech signal. In a method consistent with the present invention, an optimal filter frequency is determined and the speech signal is filtered with the filter cutoff frequency to obtain a filtered signal that approximates a fundamental frequency. The filtered speech signal is segmented and voiced periods are determined. The speech signal is divided into frames based on the voiced periods. Also consistent with the present invention is a computer-readable medium containing instructions for controlling a computer system to perform a method for dividing a speech signal into frames in synchrony with pitch of the speech signal as disclosed herein.

Consistent with the present invention, a speech processing apparatus for dividing a speech signal into frames comprises means for determining an optimal filter cutoff frequency; and means for filtering the speech signal with the filter to obtain a filtered signal that approximates a fundamental frequency. The apparatus also comprises means for segmenting the filtered speech signal into a plurality of speech segments; and means for determining which speech segments are voiced periods. The speech signal is divided into frames based on the voiced periods.

A speech recognition system consistent with the present invention comprises an input device for receiving a speech signal; a first processor for determining an optimal filter cutoff frequency; a filter for filtering the speech signal based on the optimal filter cutoff frequency to obtain a filtered signal that approximates a fundamental frequency; a segmentation module for segmenting the filtered speech signal into a plurality of speech segments; a second processor for determining which speech segments are voiced periods; and a third processor for dividing the speech signal into frames based on the voiced periods.

BRIEF DESCRIPTION OF THE DRAWINGS

The accompanying drawings, which are incorporated in and constitute a part of this specification and, together with the description, serve to explain the advantages and principles of the invention.

DETAILED DESCRIPTION OF THE PREFERRED EMBODIMENTS

Reference will now be made in detail to the present preferred embodiments of the invention, which are illustrated in the accompanying drawings. Wherever possible, the same reference numbers will be used throughout the drawings to refer to the same or like parts.

Figure 1:
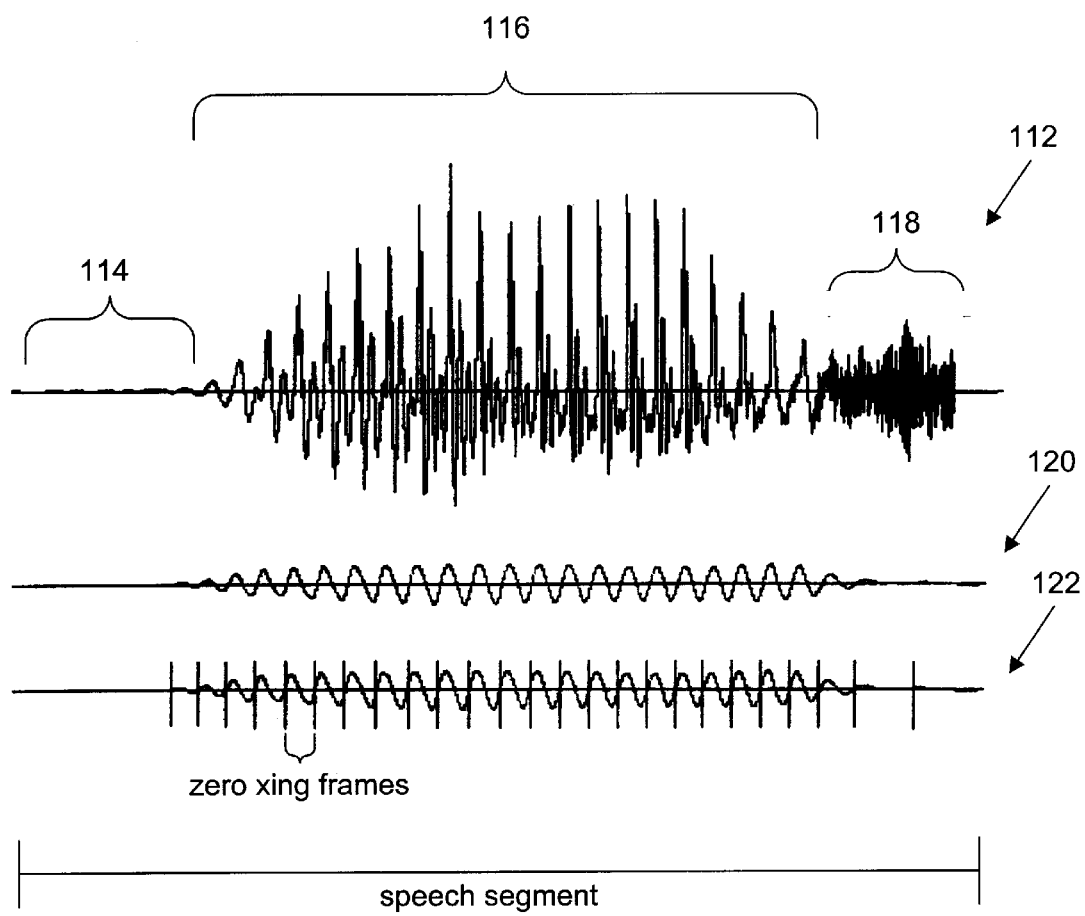
FIG. 1 illustrates three examples of wave forms.

FIG. 1 shows a signal 122 that has been filtered and divided into frames consistent with the present invention. Waveform 112 illustrates an unfiltered input signal having quiet area 114, voiced area 116, and unvoiced area 118. Quiet area 114 is an example of a signal without any voice or other noise. Voiced area 116 is an example of a signal whose source is generated by the vocal cords. Unvoiced area 118 shows a signal whose source is not produced by the vocal cords. Waveform 120 is an example of a sound wave that has been filtered down to a frequency approximating the fundamental frequency, or pitch, of the voice. Quiet area 114 and unvoiced area 118 do not have pitch because no voice is present in the underlying signal. Waveform 122 illustrates a filtered waveform that has been divided into pitch periods, or frames, based on the zero-crossing locations output. Unvoiced and quiet zero-crossing frames are segmented to match voiced areas. Each pitch period may be referred to as a pitch synchronous frame.

A. Frame Determination Method

Figure 2:
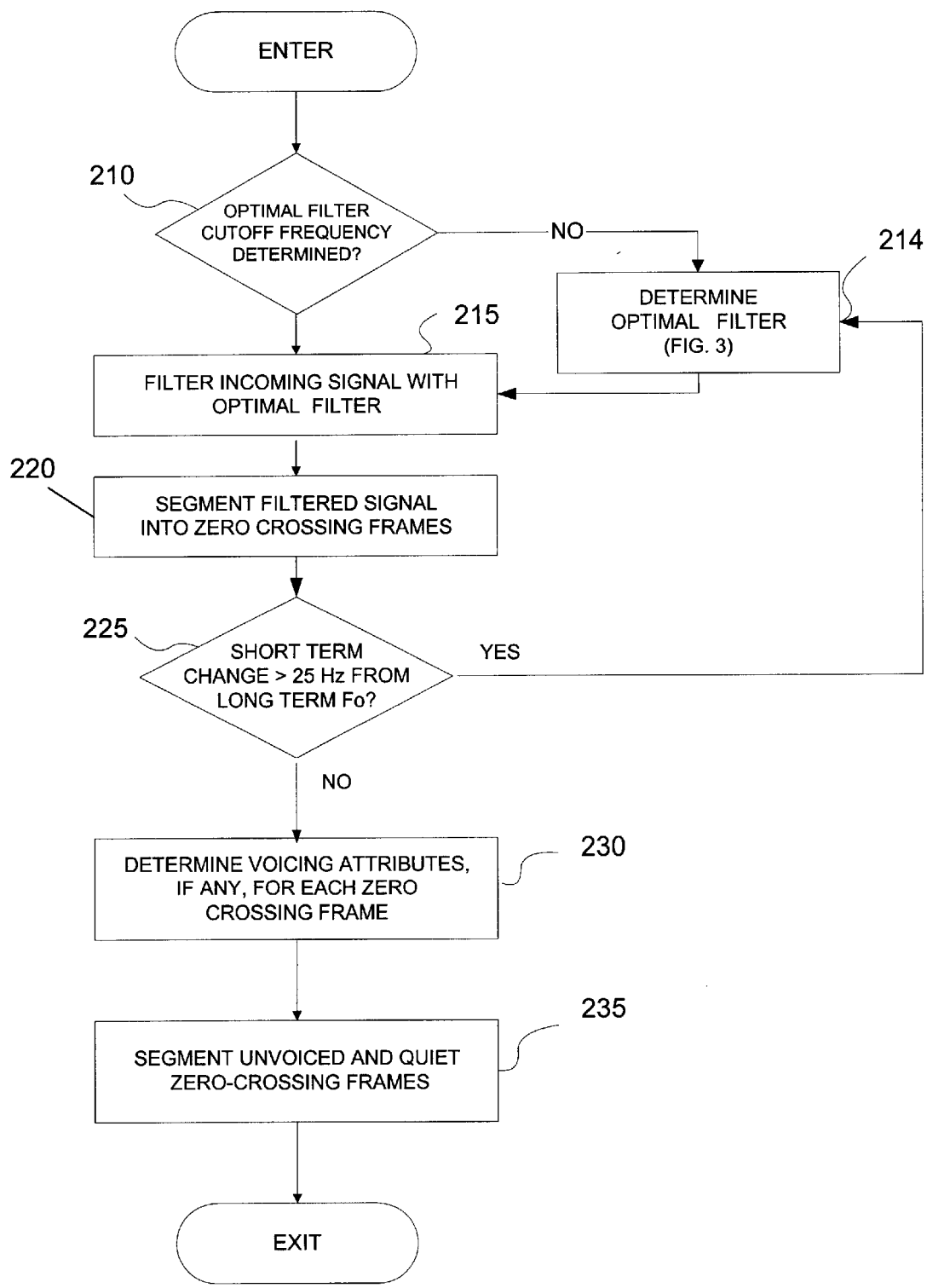
FIG. 2 is a flow chart of methods consistent with the invention for finding the pitch period.

FIG. 2 is a flow chart of methods consistent with the invention for determining pitch period. Consistent with the present invention, the input signal is filtered at a frequency as low as possible to remove all other frequencies, but not so low as to degrade the fundamental frequency. If an optimal filter cutoff frequency has not yet been determined (stage 210), it is determined in stage 214.

Figure 3:
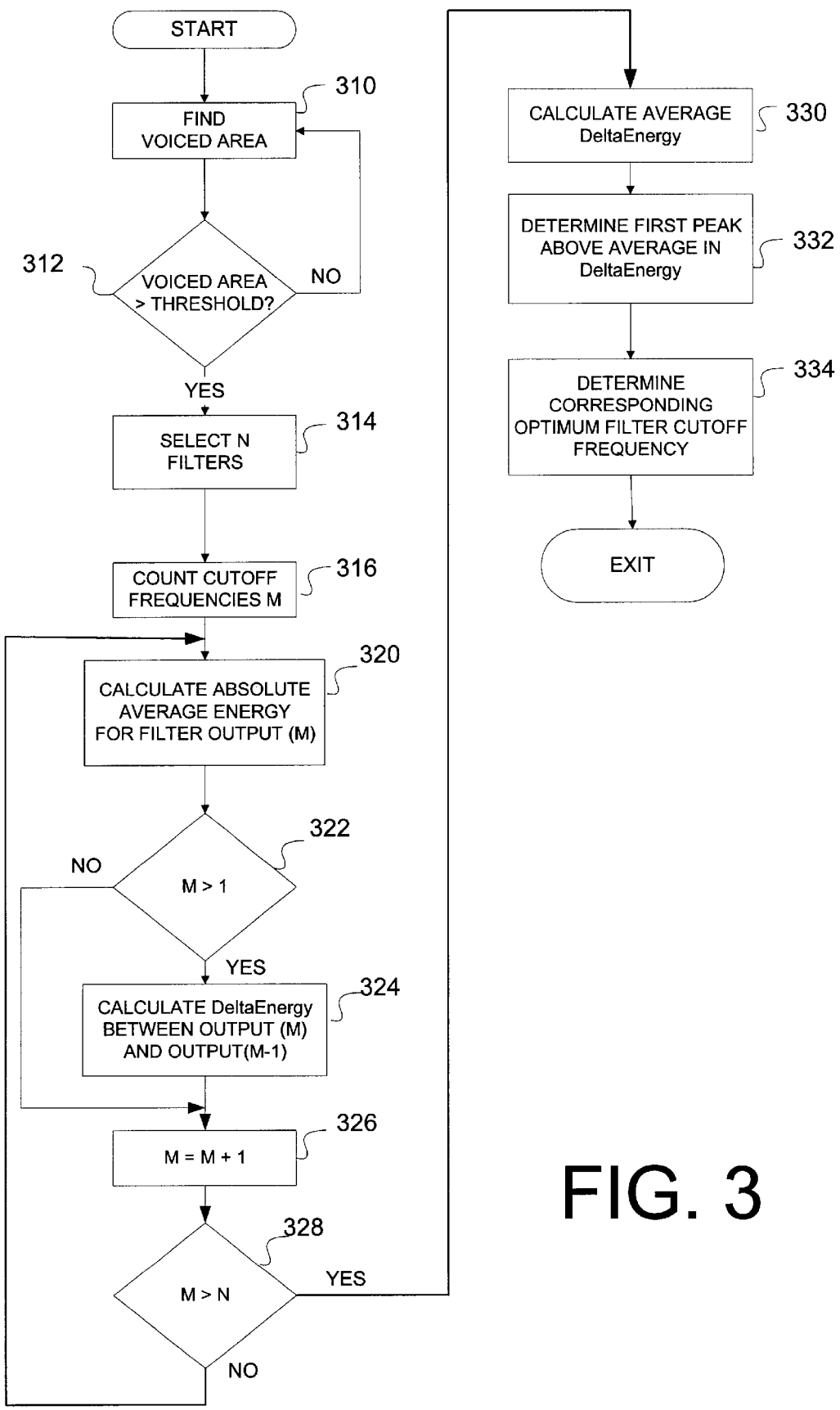
FIG. 3 is a flow chart of steps for determining the optimum filter for a given speaker, stage 214 of FIG. 2.

FIG. 3 is a flow chart showing how to determine the optimum filter for a given speaker. Determining the optimum filter is an important step in accurately and consistently measuring the pitch period. To begin, the method searches the incoming voice signal to find an area of the signal that is voiced (stage 310). Any area where the energy is high and the zero crossing rate of the input signal is low is acceptable. If the voiced area is not longer than the threshold, the signal is further searched until another voiced area is located (stage 310). If the voiced area is longer than a time threshold (stage 312), the process continues with stage 314. The time threshold may be any length but should be long enough so that genuine voiced periods are detected. As an example, average speech has voice sections as short as 50milliseconds and as long as 250milliseconds.

The input signal is then passed through multiple filters (selected at stage 314). The filters may have any cutoff frequency, however, fundamental frequencies generally range from 70 hz to 350 hz. Counter M counts the number of different cutoff frequencies used to filter the input signal and, to begin, M is set to one (stage 316). The input signal is filtered using each of N cutoff frequencies and the energy of each output is calculated (stage 320). For the first iteration (stage 322), the difference in energy is not calculated (stage 324) and the process continues at stage 326. For the second and succeeding cutoff frequencies (stage 328), the difference between the current cutoff frequency and the previous cutoff frequency (DeltaEnergy) is calculated (stage 324). Counter M is incremented by 1 (stage 326). If the input signal has been filtered using each of N cutoff frequencies, the process continues with stage 330. If not, the process returns to stage 320 and filters the input using the next cutoff frequency.

When the input signal has been filtered using each of N cutoff frequencies (stage 328), the average DeltaEnergy is calculated (stage 330). The first peak in DeltaEnergy above the average DeltaEnergy is identified (stage 332).

Figure 4:
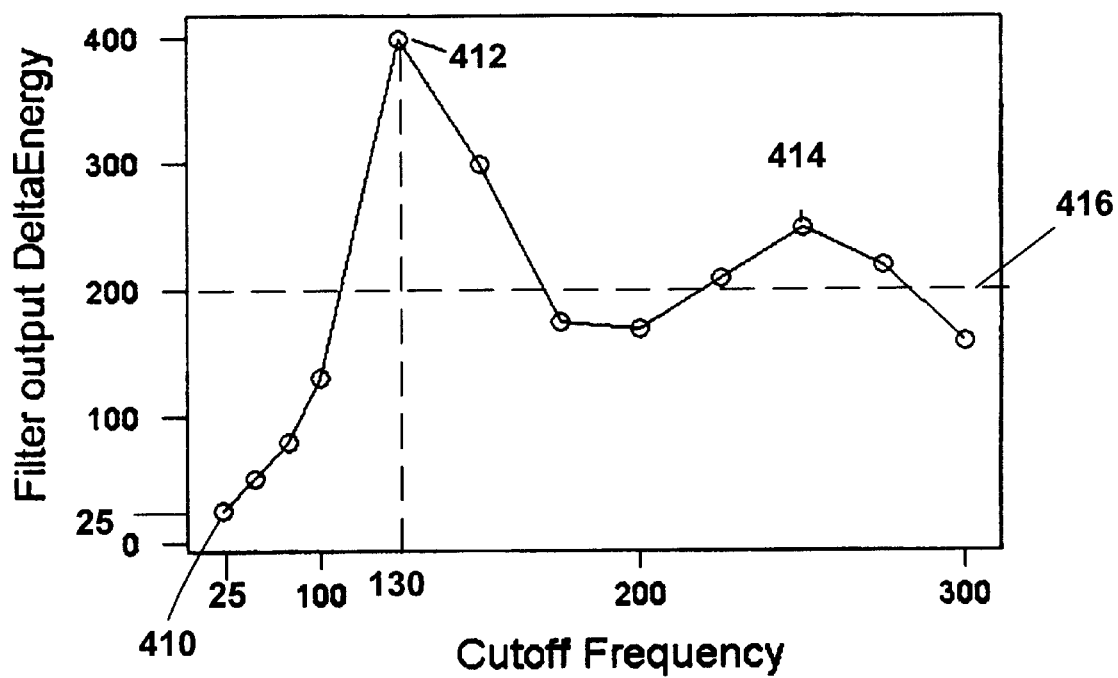
FIG. 4 is a graph of cutoff frequency versus filter output delta energy.

FIG. 4 is a graph for illustrating the selection of an optimum filter by locating the first peak above average DeltaEnergy. DeltaEnergy is plotted along the Y axis while the X axis indicates the cutoff filter frequencies measured in hertz (hz). Point 410, for example, indicates that at cutoff frequency 25 hz, the difference in energy between the first and second cutoff frequencies was approximately 25 hz. Similarly, point 412 indicates that the change in energy between the fifth and sixth cutoff frequencies is approximately 380 hz. Dashed line 416 indicates the average DeltaEnergy or the average of all of the points. The filter frequency that corresponds to the first peak in DeltaEnergy is the optimum filter cutoff frequency (stage 334). As shown in FIG. 4, point 412 is the first peak in DeltaEnergy that is above the average DeltaEnergy and corresponds to the optimum filter cutoff frequency of 130. A frequent problem with prior art PDAs is that they mistakenly choose the first harmonic, shown at point 414, rather than the fundamental frequency.

Returning now to FIG. 2, the input signal is filtered using the optimal filter determined in stage 214, which in this example is 130 hz (stage 215). The filtered output signal is divided into frames based on positively sloped zero crossings (stage 220). For each frame, the fundamental frequency of the frame is calculated, added to the fundamental frequencies calculated for previous frames, and an average fundamental frequency over all frames is calculated. If the fundamental frequency for the short term (or current segment) has changed by more than some threshold from the long term (average fundamental frequency for signal), the underlying voice may have changed and the optimal filter should be recalculated (stage 214). This condition may arise when, for example, the speaker changes, becomes excited, or becomes hoarse.

If there is no significant change in the short term when compared to the long term (stage 225), the process continues by determining voicing attributes, if any, for each zero-crossing frame (stage 230). As shown in FIG. 1, voiced periods will have significant energy in the input signal (waveform 112) as well as the filter output (waveform 120). Unvoiced periods will have significant energy in the input signal (waveform 112) but not in the output of the filter (waveform 112) because unvoiced areas have little to no energy in the low frequency ranges. Quiet areas will have little energy in either the input signal or the filter output.

Figure 5:
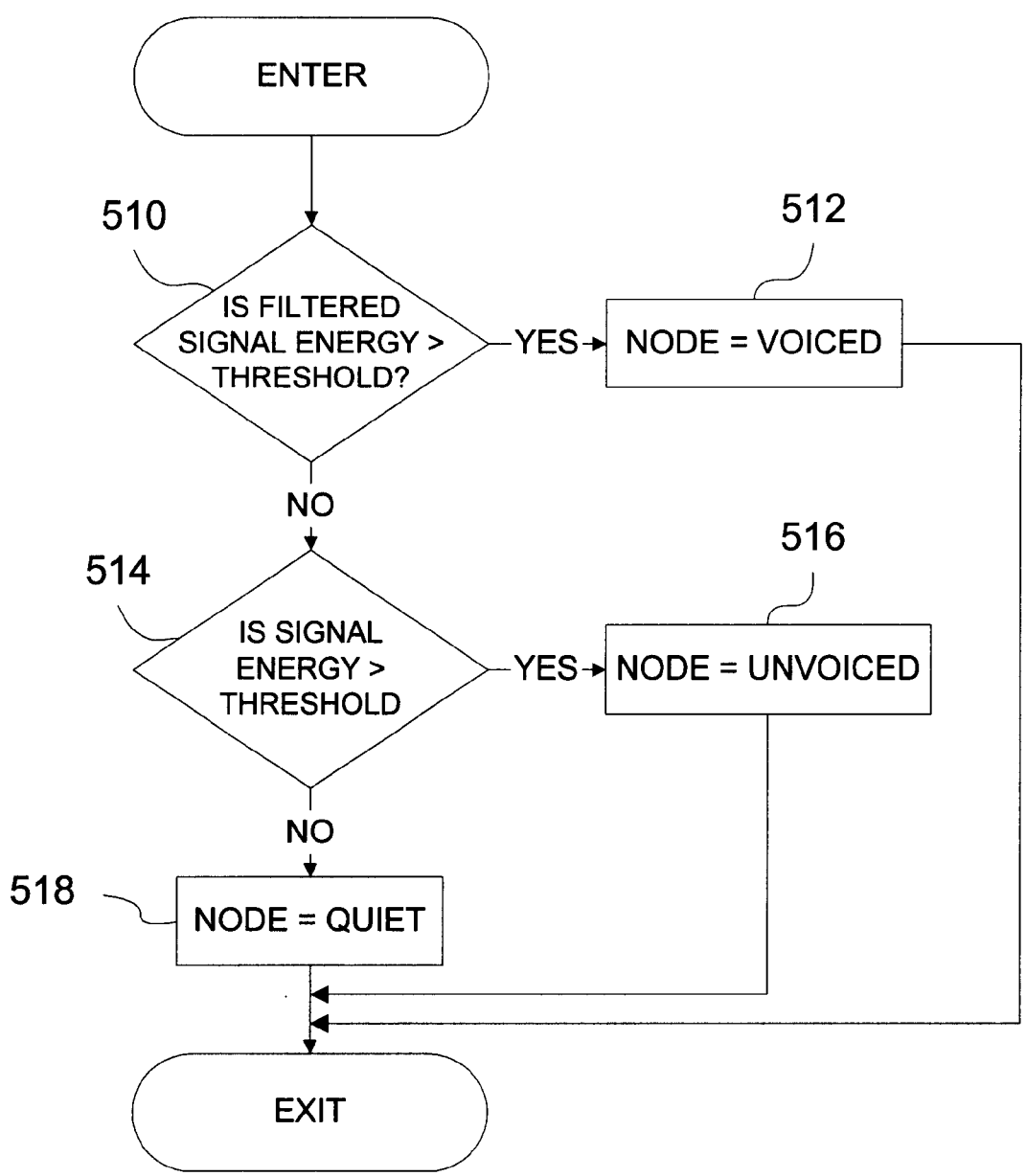
FIG. 5 is a flow chart of steps for determining voiced periods, stage 230 of FIG. 2.

FIG. 5 illustrates a process for determining whether a period is voiced. If the energy of the filtered signal is greater than a threshold (stage 510), the segment is voiced (stage 512). The threshold can be any positive value. If the magnitude of the filtered signal is not greater than a threshold, the process continues with stage 514. If the input signal is greater than a threshold (stage 514), the period is unvoiced (stage 516). If the input signal is less than a threshold, the period is quiet or lacking any speech whether voiced or unvoiced (stage 518).

Returning to the flow diagram of FIG. 2, frames are created for the unvoiced and quiet zero-crossing frames (stage 235). As shown in FIG. 2, frames are chosen so as to be in synchrony with the fundamental frequency in the voiced period. Since there is no fundamental frequency in unvoiced and quiet areas, those areas are divided up into frames approximately equal to the length of the average fundamental frequency calculated at stage 220.

B. Frame Determination Processor

Figure 6:
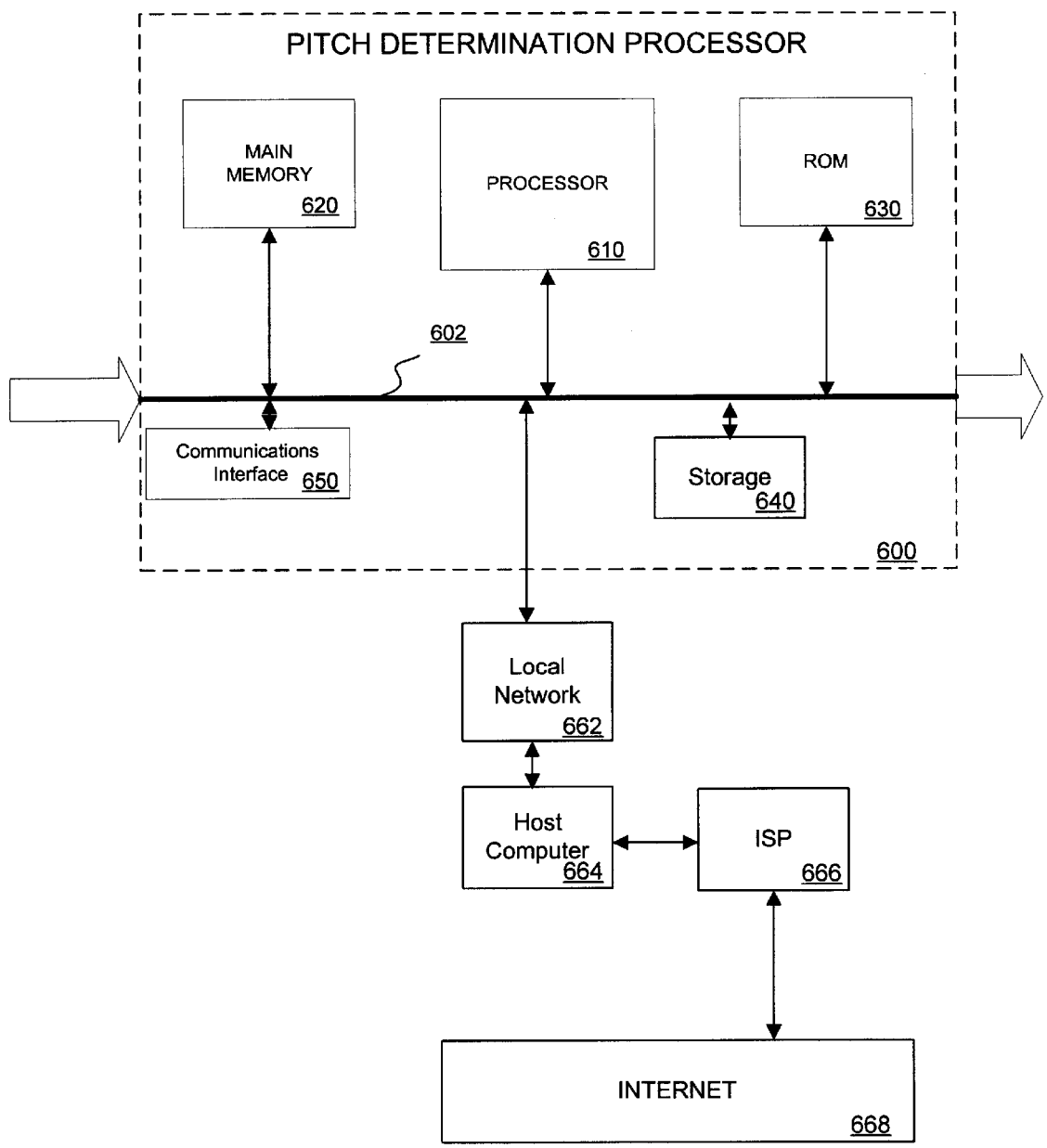
FIG. 6 is a block diagram of an apparatus consistent with the present invention.

FIG. 6 is a block diagram showing an apparatus consistent with the present invention. Pitch determination processor (PDP) 600 comprises one or more processors 610 and a main memory 620, or other dynamic storage device for storing information and instructions to be executed by processor 610. Main memory 620 also may be used for storing temporary variables or other intermediate information during execution of instructions to be executed by processor 610. PDP 600 further includes a read only memory (ROM) 630 or other static storage device coupled to bus 602 for storing static information and instructions for processor 610. A storage device 640, such as a magnetic disk or optical disk, is provided and coupled to bus 602 for storing information and instructions.

Processor 610 may be, for example, hardware or software configured to execute the stages of a method for determining pitch synchronous frames consistent with the present invention. Processor 610 may execute one or more sequences of one or more instructions contained in main memory 620. Such instructions may be read into main memory 620 from another computer-readable medium, such as storage device 640. Execution of the sequences of instructions contained in main memory 620 causes processor 610 to perform the process stages described herein. In an embodiment consistent with the present invention, hard-wired circuitry may be used in place of, or in combination with, software instructions to implement the invention. Thus implementations of the invention are not limited to any specific combination of hardware circuitry and software.

The term "computer-readable medium" as used herein refers to any media that participates in providing instructions to processor 610 for execution. Such a medium may take many forms, including but not limited to, non-volatile media, volatile media, and transmission media. Non-volatile media includes, for example, optical or magnetic disks, such as storage device 640. Volatile media includes dynamic memory, such as main memory 620. Transmission media includes coaxial cables, copper wire, and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 610 for execution. For example, the instructions may initially be carried on magnetic disk of a remote computer. The remote computer can load the instructions into its dynamic memory and send the instructions over a telephone line using a modem. A modem local to PDP 600 can receive the data on the telephone line and use an infra-red transmitter to convert the data to an infra-red signal. An infra-red detector coupled to bus 602 can receive the data carried in the infra-red signal and place the data on bus 602. Bus 602 carries the data to main memory 620, from which processor 610 retrieves and executes the instructions. The instructions received by main memory 620 may optionally be stored on storage device 640 either before or after execution by processor 610.

PDP 600 also includes a communication interface 650 coupled to bus 602. Communication interface 650 provides a two-way data communication coupling to a local network 662. For example, communication interface 650 may be an integrated services digital network (ISDN) card or a modem to provide a data communication connection to a corresponding type of telephone line. As another example, communication interface 650 may be a local area network (LAN) card that provides a data communication connection to a compatible LAN. Wireless links may also be implemented. In any such implementation, communication interface 650 sends and receives electrical, electromagnetic, or optical signals that carry digital data streams representing various types of information.

Communications interface 650 may provide data communication to other data devices through one or more networks to other data devices. For example, PDP 600 may be connected through a local network 662 to a host computer 664 and/or to data equipment operated by an Internet Service Provider (ISP) 666. ISP 666 in turn provides data communication services through the Internet 668. Local network 662 and Internet 668 both use electric, electromagnetic, or optical signals that carry digital data streams. The signals through the various networks and through communication interface 650, which carry the digital data, including program code, to and from PDP 600, are exemplary forms of carrier waves transporting the information. The received code may be executed by processor 610 as it is received, and/or stored in storage device 640, or other non-volatile storage for later execution. In this manner, PDP 600 may obtain application code in the form of a carrier wave.

C. Speech Processing System

Figure 7:
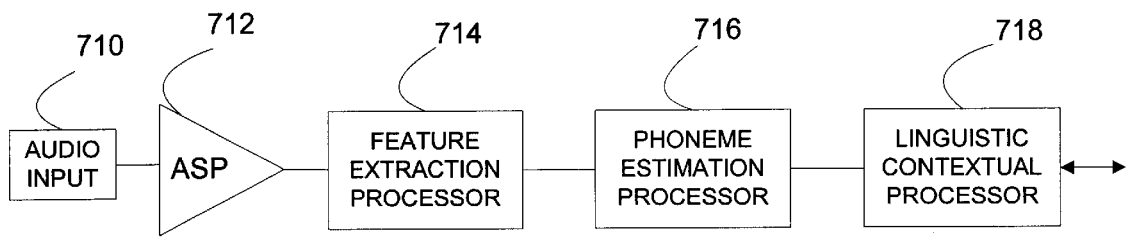
FIG. 7 is a block diagram of a speech recognition system consistent with the present invention.

FIG. 7 is a block diagram showing a speech recognition system consistent with the present invention. Audio signals are received via audio input 710. In embodiments consistent with the present invention, audio input 710 may be any source of audio input information such as, for example, a microphone, a telephone line or audio storage device.

Audio input 710 feeds an analog audio signal to audio signal processor (ASP) 712. ASP 712 converts the analog audio signal into a digital signal at a suitable sampling rate. Sampling rates of 8 KHz to 44 KHz are preferred, however, other sampling rates may be used provided that appropriate digital signal processing is performed. In a system consistent with the present invention, ASP 712 is comprised of analog-to-digital processing circuitry and filtering components, as is well understood in the art. For example, ASP 712 may comprise a preamplifier, anti-alias filter, sample and hold structure, and analog-to-digital converter. ASP 712 may be any standard analog-to-digital converter means capable of receiving an audio electrical signal and outputting a digital audio signal to feature extraction processor 714.

Feature extraction processor 714 breaks the digital audio signal into segments and determines particular predetermined features of that segment. Consistent with the present invention, feature extraction processor 714 divides the digital audio signal into pitch synchronous frames determined as described herein. For each frame, feature extraction processor 714 may extract time domain and/or frequency domain information about the audio signal, as well as other types of information which characterize the signal. Frequency domain characteristics convey information about the frequency of the signal segment. The amplitude of the signal as it is passed through a filter tuned to a particular frequency band is one example of a frequency domain characteristic. Time domain information describes a characteristic of a signal segment over a finite period of time. Examples of time domain characteristics include, but are not limited to, such parameters as the average amplitude, the absolute difference average, and the zero crossing rate of the audio signal segment.

Feature extraction processor 714 outputs the extracted features of each frame to phoneme estimation processor (PEP) 716. PEP 716 receives feature vectors from feature extraction processor 714, processes the feature vectors, and outputs phoneme probabilities to linguistic contextual processor 718. PEP 716 may be, for example, of the type described in U.S. patent application Ser. No. 09/131,318,to Younger et al., filed on Aug 7, 1998, entitled "Methods and Apparatus for Phoneme Estimation Using Neural Networks," the contents of which are hereby incorporated by reference.

Linguistic contextual processor 718 uses the probability vectors received from PEP 400 to determine the most probable phoneme for a speech segment. Linguistic contextual processor 718 combines or segments the phoneme estimates to produce words and grammar.

CONCLUSION

In accordance with the present invention, methods and apparatus consistent with the present invention determine pitch synchronous frames in an audio speech signal. An optimal filter cutoff frequency is determined and the speech signal is filtered with the filter frequency so that the filtered signal approximates the fundamental frequency of the input speech signal. The filtered signal is then segmented into frames and the speech frames that are voiced periods are identified. The speech signal is divided into frames based on the voiced periods.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or hardware alone. The scope of the invention is defined by the claims and their equivalents.

What is claimed is:

1. A method of dividing a speech signal into frames comprising:

receiving the speech signal;

determining an optimal filter cutoff frequency;

filtering the speech signal with the optimal filter cutoff frequency to obtain a filtered speech signal;

segmenting the filtered speech signal into a plurality of speech segments;

acquiring information on a fundamental frequency for each of the plurality of speech segments;

determining which speech segments are voiced;

dividing the speech signal including the voiced speech segments and unvoiced speech segments into frames based on the information on the fundamental frequency acquired for the voiced speech segments; and outputting the divided speech signal.

2. The method of claim 1, wherein determining an optimal filter cutoff frequency comprises:

identifying a voiced area of the speech signal with duration exceeding a predetermined minimum time;

filtering the voiced area using each of a set of cutoff frequencies to obtain a set of output energies;

determining a set of delta values representing differences between the output energies;

determining an average difference from the set of delta values; and determining an optimal filter cutoff frequency based on the average difference.

3. The method of claim 2, wherein filtering the voiced area using each of a set of cutoff frequencies comprises:

filtering the voiced area using a set of filters.

4. The method of claim 2, wherein identifying a voiced area of the speech signal comprises:

identifying a voiced area of the speech signal with duration exceeding a threshold.

5. The method of claim 2, wherein determining an optimal filter cutoff frequency based on the average difference comprises:

determining a maximum delta value of the set of delta values, wherein the maximum delta value is greater than the average difference; and determining an optimal filter cutoff frequency corresponding to the maximum delta value.

6. The method of claim 1, wherein segmenting the filtered speech signal into a plurality of speech segments comprises:
   segmenting the filtered speech signal into a plurality of speech frames at positively sloped zero crossings;
   comparing each of the speech frames to a long term distribution of the filtered speech signal;
   comparing each of the speech frames to a short term distribution of the filtered speech signal; and
   determining the compared speech frames to be the speech segments.

7. The method of claim 1, wherein acquiring information on a fundamental frequency for each of the plurality of speech segments comprises:
   calculating a fundamental frequency for each of the speech segments; and
   determining a short term fundamental frequency based on the calculated fundamental frequency,
   and the method further comprising:
      determining another optimal filter cutoff frequency, if the short term fundamental frequency changes by more than a threshold.

8. The method of claim 1, wherein determining which speech segments are voiced comprises:
   identifying speech segments that have significant energy in the speech signal and significant energy in the filtered signal as the voiced speech segments.

9. The method of claim 7, wherein acquiring information on a fundamental frequency for each of the plurality of speech segments further comprises:
   calculating a long term fundamental frequency for the speech signal,
   and wherein determining another optimal filter cutoff frequency comprises:
      determining the threshold based on the long term fundamental frequency.

10. The method of claim 1, wherein determining which speech segments are voiced comprises:
    identifying speech segments that have significant energy in the speech signal and little to no energy in the filtered signal as the unvoiced speech segments.

11. The method of claim 1, wherein acquiring information on a fundamental frequency for each of the plurality of speech segments comprises:
    calculating a fundamental frequency for each of the speech segments; and
    calculating an average fundamental frequency for more than one of the speech segments,
    and wherein dividing the speech signal including the voiced speech segments and unvoiced speech segments into frames comprises:
       dividing the speech signal of the voiced speech segments into frames in accordance with the fundamental frequency; and
       dividing the speech signal of the unvoiced speech segments into frames in accordance with the average fundamental frequency.

12. A speech processing apparatus for dividing a speech signal into frames comprising:
    means for receiving the speech signal;
    means for determining an optimal filter cutoff frequency;
    means for filtering the speech signal with the optimal filter cutoff frequency to obtain a filtered speech signal;
    means for segmenting the filtered speech signal into a plurality of speech segments;
    means for acquiring information on a fundamental frequency for each of the plurality of speech segments;
    means for determining which speech segments are voiced;
    means for dividing the speech signal including the voiced speech segments and unvoiced speech segments into frames based on the information on the fundamental frequency for the voiced speech segments; and
    means for outputting the divided speech signal.

13. The apparatus of claim 12, wherein means for determining an optimal filter cutoff frequency comprises:
    means for identifying a voiced area of the speech signal with duration exceeding a predetermined minimum time;
    means for filtering the voiced area using each of a set of cutoff frequencies to obtain a set of output energies;
    means for determining a set of delta values representing differences between the output energies;
    means for determining an average difference from the set of delta values; and
    means for determining an optimal filter cutoff frequency based on the average difference.

14. The apparatus of claim 13, wherein means for filtering the voiced area using each of a set of cutoff frequencies comprises:
    means for filtering the voiced area using a set of filters.

15. The apparatus of claim 13, wherein means for identifying a voiced area of the speech signal comprises:
    means for identifying a voiced area of the speech signal with duration exceeding a threshold.

16. The apparatus of claim 13, wherein means for determining an optimal filter cutoff frequency based on the average difference comprises:
    means for determining a maximum delta value of the set of delta values, wherein the maximum delta value is greater than the average difference; and
    means for determining an optimal filter cutoff frequency corresponding to the maximum delta value.

17. The apparatus of claim 12, wherein means for segmenting the filtered speech signal into a plurality of speech frames comprises:
    means for segmenting the filtered speech signal into a plurality of speech frames at positively sloped zero crossings;
    means for comparing each of the speech frames to a long term distribution of the filtered speech signal;
    means for comparing each of the speech frames to a short term distribution of the filtered speech signal; and
    means for determining the compared speech frames to be the speech segments.

18. The apparatus of claim 12, wherein means for acquiring information on a fundamental frequency for each of the plurality of speech segments comprises:
    means for calculating a fundamental frequency for each of the speech segments; and
    means for determining a short term fundamental frequency based on the calculated fundamental frequency,
    and the apparatus further comprising:
       means for determining another optimal filter cutoff frequency, if the short term fundamental frequency changes by more than a threshold.

19. The apparatus of claim 12, wherein means for determining which speech segments are voiced comprises:

means for identifying speech segments that have significant energy in the speech signal and significant energy in the filtered signal as the voiced speech segments.

20. The apparatus of claim 18, wherein means for acquiring information on a fundamental frequency for each of the plurality of speech segments further comprises:
   means for calculating a long term fundamental frequency for the speech signal,
   and wherein means for determining another optimal filter cutoff frequency comprises:
      means for determining the threshold based on the long term fundamental frequency.

21. The apparatus of claim 12, wherein means for determining which speech segments are voiced comprises:
   means for identifying speech segments that have significant energy in the speech signal and little to no energy in the filtered signal as the unvoiced speech segments.

22. The apparatus of claim 12, wherein means for acquiring information on a fundamental frequency for each of the plurality of speech segments comprises:
   means for calculating a fundamental frequency for each of the speech segments; and
   means for calculating an average fundamental frequency for more than one of the speech segments,
   and wherein means for dividing the speech signal including the voiced speech segments and unvoiced speech segments into frames comprises:
      means for dividing the speech signal of the voiced speech segments into frames in accordance with the fundamental frequency; and
      means for dividing the speech signal of the unvoiced speech segments into frames in accordance with the average fundamental frequency.

23. A computer-readable medium containing instructions for controlling a computer system to perform a method of dividing a speech signal into frames, the computer system having a group of data structures reflecting a logical structure of a data source, the method comprising:
   receiving the speech signal;
   determining an optimal filter cutoff frequency;
   filtering the speech signal with the optimal filter cutoff frequency to obtain a filtered speech signal;
   segmenting the filtered speech signal into a plurality of speech segments;
   acquiring information on a fundamental frequency for each of the plurality of speech segments;
   determining which speech segments are voiced;
   dividing the speech signal including the voiced speech segments and unvoiced speech segments into frames based on the information on the fundamental frequency acquired for the voiced speech segments; and
   outputting the divided speech signal.

24. The computer-readable medium of claim 23, wherein determining an optimal filter cutoff frequency comprises:
   identifying a voiced area of the speech signal with duration exceeding a predetermined minimum time;
   filtering the voiced area using each of a set of cutoff frequencies to obtain a set of output energies;
   determining a set of delta values representing differences between the output energies;
   determining an average difference from the set of delta values; and
   determining an optimal filter cutoff frequency based on the average difference.

25. The computer-readable medium of claim 24, wherein filtering the voiced area using each of a set of cutoff frequencies comprises:
   filtering the voiced area using a set of filters.

26. The computer-readable medium of claim 24, wherein identifying a voiced area of the speech signal comprises:
   identifying a voiced area of the speech signal with duration exceeding a threshold.

27. The computer-readable medium of claim 24, wherein determining an optimal filter cutoff frequency based on the average difference comprises:
   determining a maximum delta value of the set of delta values, wherein the maximum delta value is greater than the average difference; and
   determining an optimal filter cutoff frequency corresponding to the maximum delta value.

28. The computer-readable medium of claim 23, wherein segmenting the filtered speech signal into a plurality of speech segments comprises:
   segmenting the filtered speech signal into a plurality of speech frames at positively sloped zero crossings;
   comparing each of the speech frames to a long term distribution of the filtered speech signal;
   comparing each of the speech frames to a short term distribution of the filtered speech signal; and
   determining the compared speech frames to be the speech segments.

29. The computer-readable medium of claim 23, wherein acquiring information on a fundamental frequency for each of the plurality of speech segments comprises:
   calculating a fundamental frequency for each of the speech segments; and
   determining a short term fundamental frequency based on the calculated fundamental frequency,
   and the method further comprising:
      determining another optimal filter cutoff frequency, if the short term fundamental frequency changes by more than a threshold.

30. The computer-readable medium of claim 23, wherein determining which speech segments are voiced comprises:
   identifying speech segments that have significant energy in the speech signal and significant energy in the filtered signal as the voiced speech segments.

31. The computer-readable medium of claim 29, wherein acquiring information on a fundamental frequency for each of the plurality of speech segments further comprises:
   calculating a long term fundamental frequency for the speech signal,
   and wherein determining another optimal filter cutoff frequency comprises:
      determining the threshold based on the long term fundamental frequency.

32. The computer-readable medium of claim 23, wherein determining which speech segments are voiced comprises:
   identifying speech segments that have significant energy in the speech signal and little to no energy in the filtered signal as the unvoiced speech segments.

33. The method of claim 23, wherein acquiring information on a frequency for each of the plurality of speech segments comprises:
   calculating a fundamental frequency for each of the speech segments; and
   calculating an average fundamental frequency for more than one of the speech segments, and wherein dividing the speech signal including the voiced speech segments and unvoiced speech segments into frames comprises:

dividing the speech signal of the voiced speech segments into frames in accordance with the fundamental frequency; and dividing the speech signal of the unvoiced speech segments into frames in accordance with the average fundamental frequency.

34. A speech recognition system comprising:

an input device configured to receive a speech signal;

a first processor configured to determine an optimal filter cutoff frequency, to obtain a filtered speech signal by having the speech signal filtered with the optimal filter cutoff frequency, to segment the filtered speech signal into a plurality of speech segments, to acquire information on a fundamental frequency for each of the plurality of speech segments, to determine which speech segments are voiced, and to divide the speech signal including the voiced speech segments and unvoiced speech segments into frames based on the information on the fundamental frequency acquired for the voiced speech segments;

a second processor configured to extract features from the speech signal based on the frames; and a third processor configured to recognize a speech using the features.

* * * * *

UNITED STATES PATENT AND TRADEMARK OFFICE
CERTIFICATE OF CORRECTION

PATENT NO. : 6,470,311 B1
DATED : October 22, 2002
INVENTOR(S) : Robert Brian Moncur It is certified that error appears in the above-identified patent and that said Letters Patent is hereby corrected as shown below:

Column 12,
Line 62, after "on a" insert -- fundamental --.

Signed and Sealed this

Twenty-fifth Day of February, 2003

JAMES E. ROGAN
*Director of the United States Patent and Trademark Office*